UNITED STATES PATENT OFFICE.

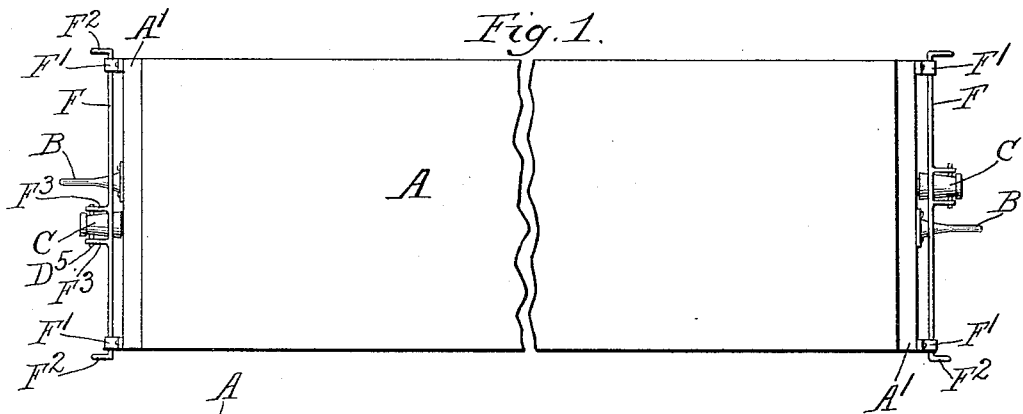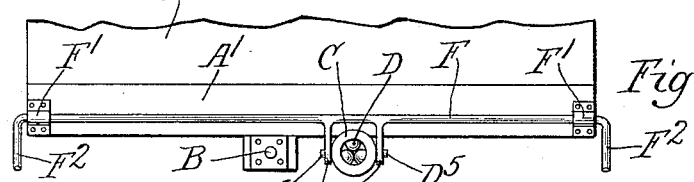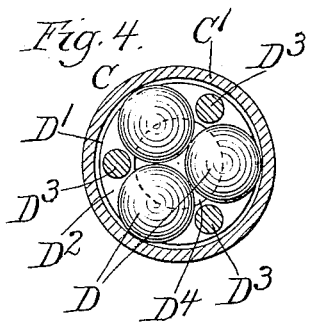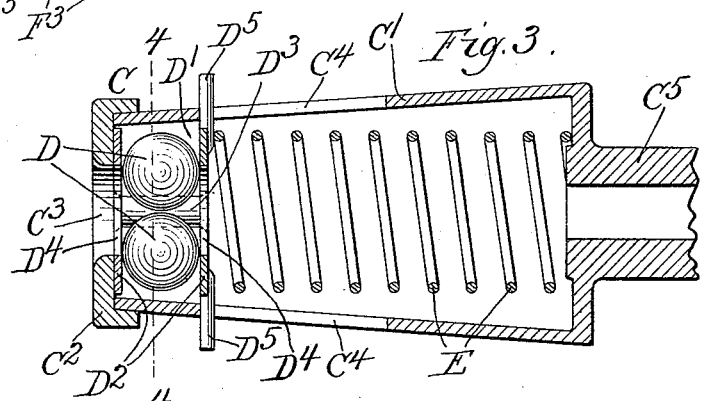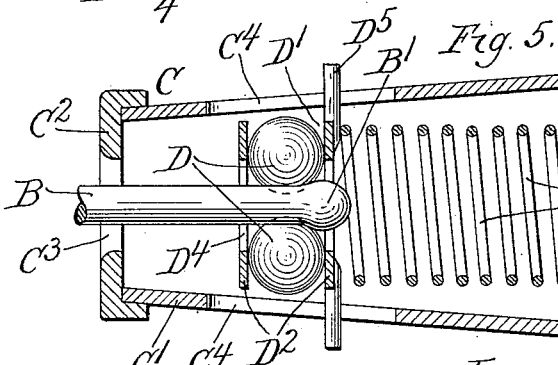

OLIVER P. M. SQUIRES, OF LAPORTE, INDIANA.

COUPLING.

1,050,308.

Specification of Letters Patent.

Patented Jan. 14, 1913.

Application filed September 13, 1909. Serial No. 517,406.

*To all whom it may concern:*

Be it known that I, OLIVER P. M. SQUIRES, a citizen of the United States, residing at Laporte, in the county of Laporte and State of Indiana, have invented a certain new and useful Improvement in Couplings, of which the following is a specification.

My invention relates to couplings and is illustrated in connection with a railroad car in the accompanying drawings, wherein—

Figure 1 is a plan view of a car equipped with such coupling; Fig. 2 is an end elevation; Fig. 3 a longitudinal section through the coupling; Fig. 4 a transverse section on the line 4—4 of Fig. 3; Fig. 5 a longitudinal section showing the coupling in operation.

Like parts are indicated by the same letter in all the figures.

The car A having the platform $A^1$ has attached to it the rigid bar B and the coupling C, which comprises the truncated conical shell $C^1$, having at one end the cap $C^2$ provided with the hole $C^3$ therethrough, the slots $C^4$ and the rearwardly extending shank $C^5$.

The balls D are movably supported in the shell by means of the ball cage $D^1$ which consists of the plates $D^2$ and connecting bars $D^3$ and has therethrough the holes $D^4$ and is provided with the protruding lugs $D^5$ which travel in the slots $C^4$ in the shell $C^1$. The ball cage is normally kept in contact with the cap $C^2$ at the smaller end of the casing by means of the spring E. The bar F supported by the bearings $F^1$ has the handles $F^2$ and arms $F^3$ adapted to engage the lugs $D^5$.

I have shown the rigid bar B provided with an enlargement $B^1$. It will be obvious however that this may be dispensed with if it seems desirable so to do.

I have shown an operative device but I do not wish to be limited to the precise form, construction and arrangement shown, since they may be greatly altered without departing from the spirit of my invention.

The use and operation of my invention are as follows: The balls D are held in adjustment in the conical shell by means of the ball cage $D^1$. This cage is provided with the lugs $D^5$ by means of which the cage may be retracted from the small end of the casing against the pressure of the spring E. The opening $C^3$ in the cap allows passage to the bar B or any other part which is to be held. This bar forces the balls back in the tapering shell until a point is reached at which the bar is enabled to penetrate between the balls. When this is done the bar is allowed to slide on through for a short distance, the balls no longer being forced back by it. As soon as tension is exerted upon the bar B the balls are carried by the friction with the bar down into the tapering portion of the case. The result of this is to wedge the balls between the tapering walls of the case and the cylindrical exterior of the bar. The greater the tension exerted upon the bar the greater will be the wedging of the balls between the bar and tapering wall of the casing. The nature of this device is such that as the tension increases the holding force increases so that there is no possibility of the coupling letting go until the point of rupture has been reached.

I have shown this device as a coupling in connection with a railroad carriage, but it will be evident that it is applicable to any condition wherein two portions are adapted to be releasably held together. The bar B may be disengaged from the coupling by pulling backward upon the lugs $D^5$ against the action of the spring E. The result of this will be to carry the ball cage and balls away from the small end of the casing into a portion of it wherein the distance between the surface of the bar and the wall of the casing is so great that the wedging action is no longer apparent. This, of course, will release the bar and it can then be pulled out without difficulty. I have called the device a coupling. It is really an interlocking device.

It will be evident that many different shapes and arrangements of the balls and casing may be employed without materially departing from the spirit of the invention.

I claim:—

An interlocking device comprising a plurality of balls, a tapering receiver for said balls and a ball cage therein holding such balls, said cage comprising a front and rear containing plate and connecting bars.

OLIVER P. M. SQUIRES.

Witnesses:
 MINNIE M. LINDENAN,
 LUCY A. FALKENBERG.

Copies of this patent may be obtained for five cents each, by addressing the "Commissioner of Patents, Washington, D. C."